Figure 1:
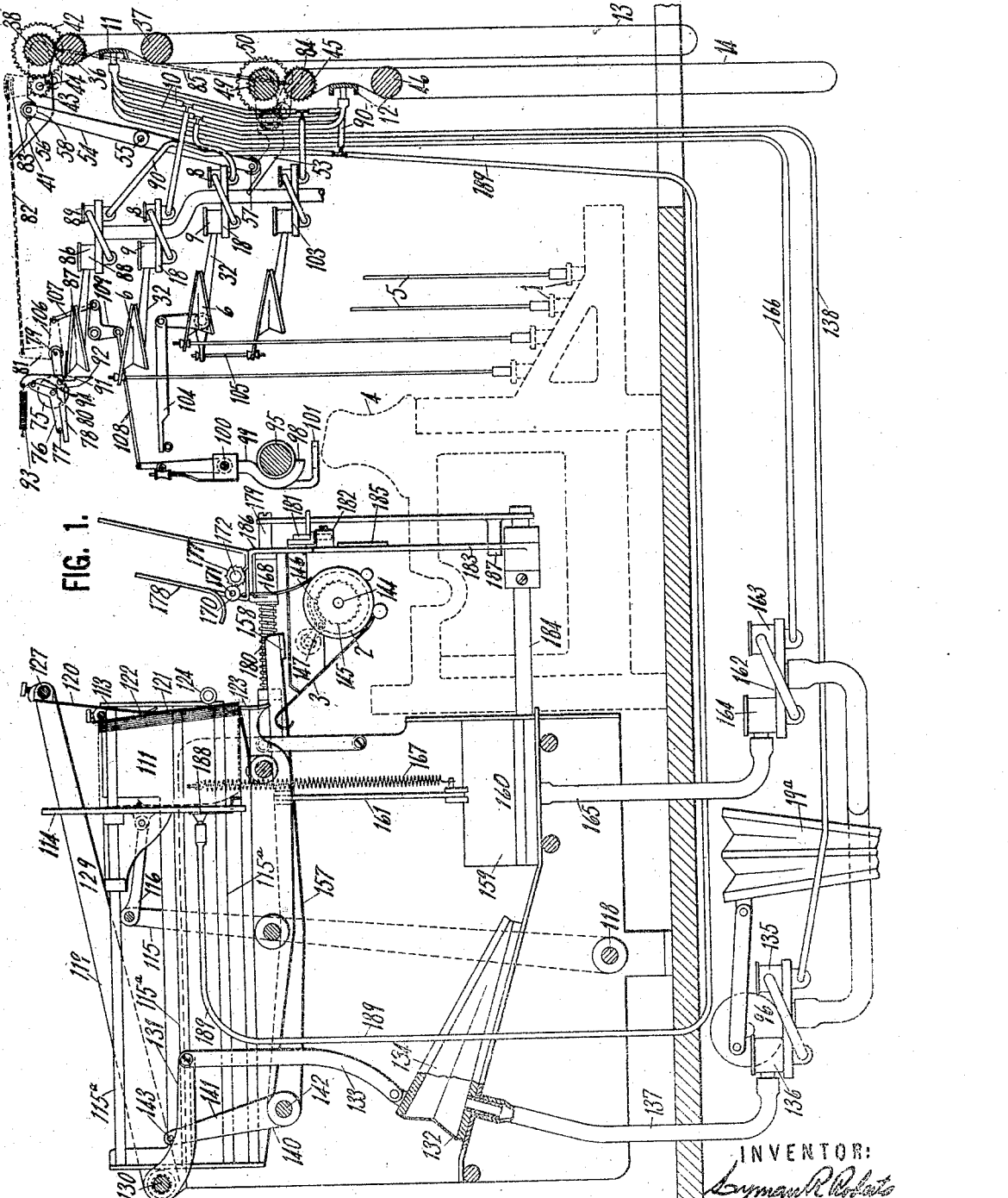

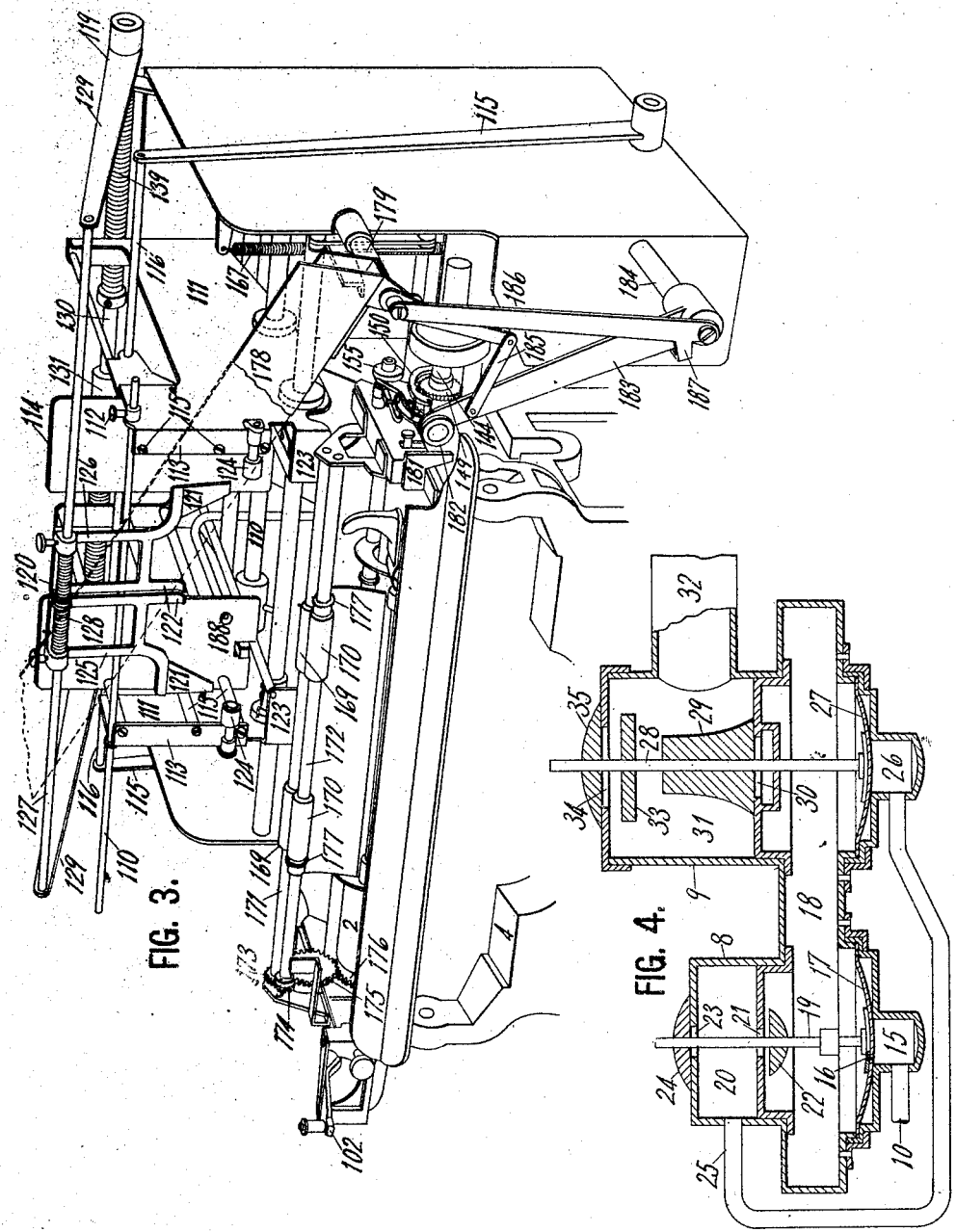

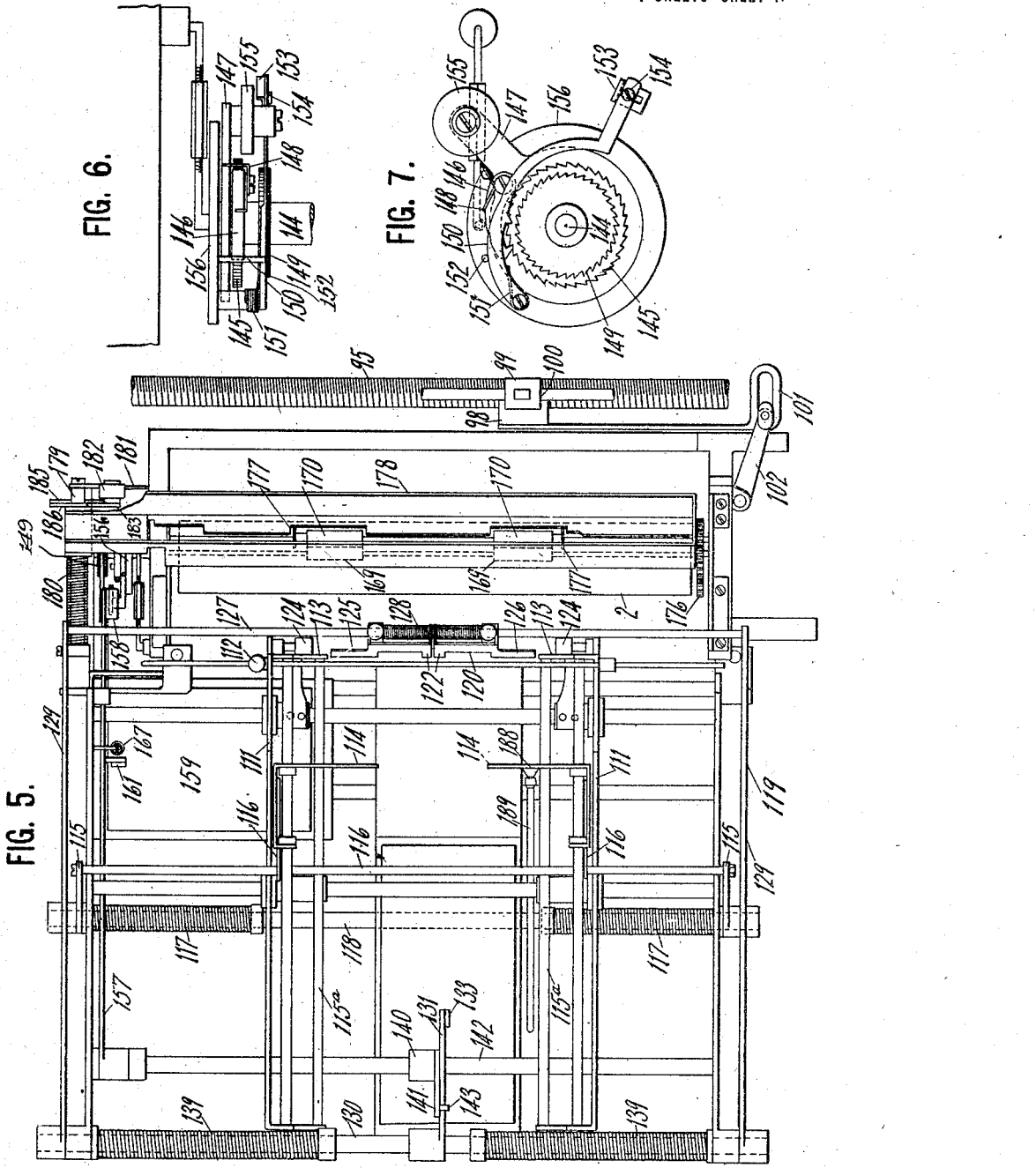

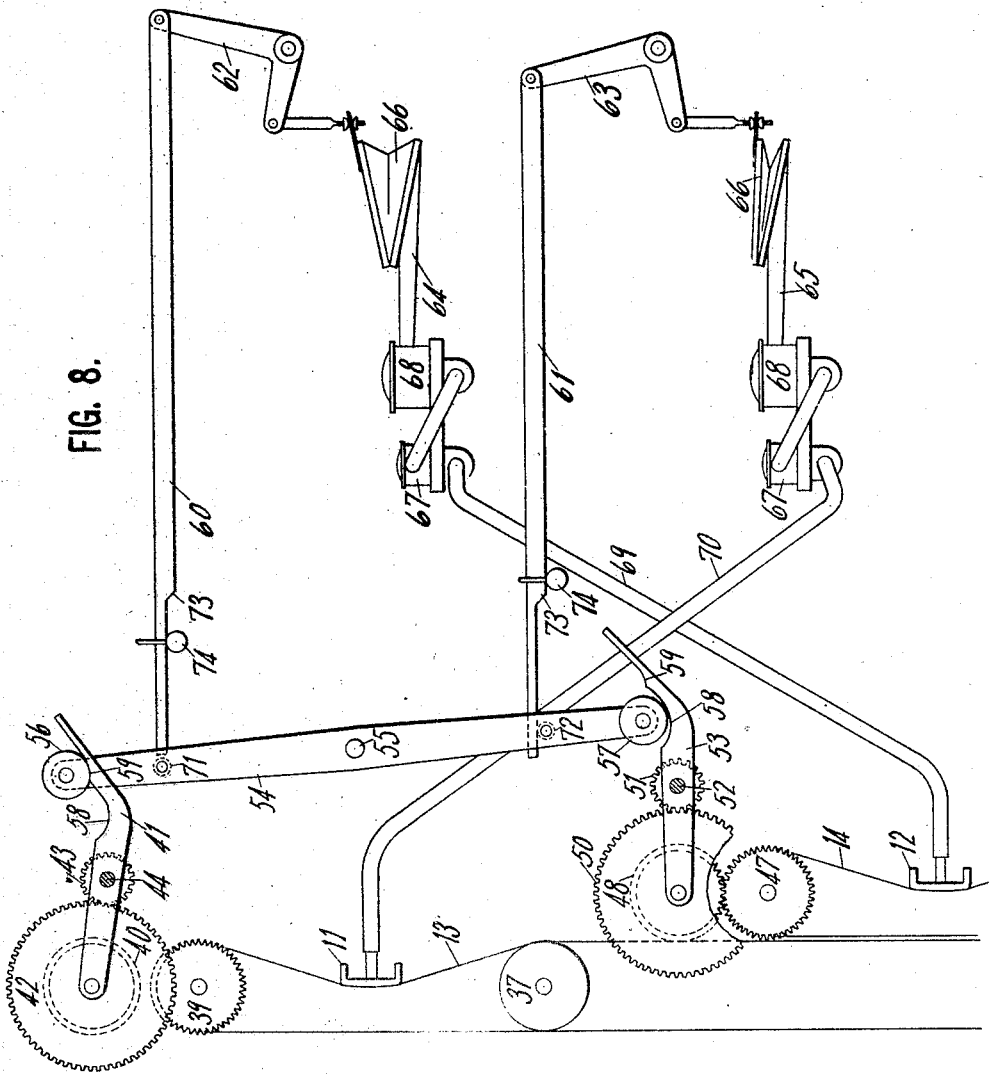

L. R. ROBERTS.
AUTOMATIC TYPE WRITER OPERATOR.
APPLICATION FILED AUG. 31, 1911.
1,171,888.
Patented Feb. 15, 1916.
7 SHEETS—SHEET 6.
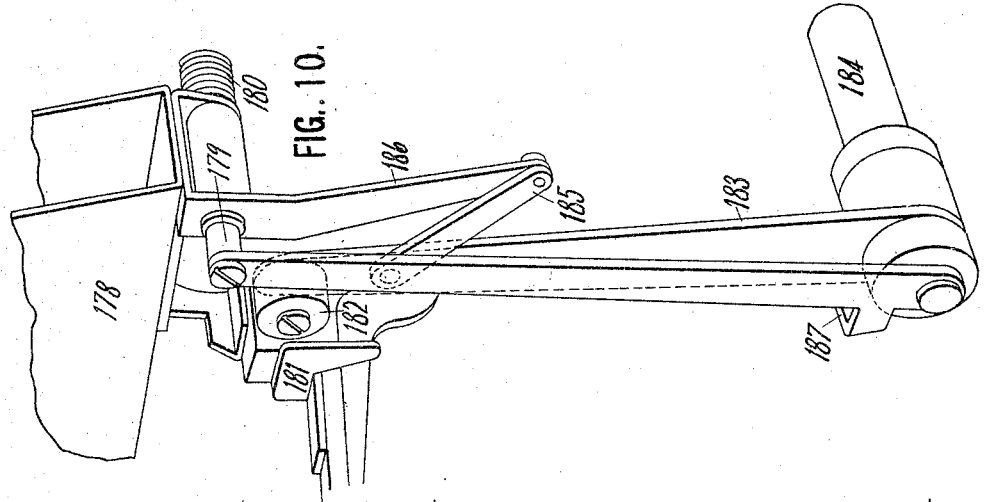
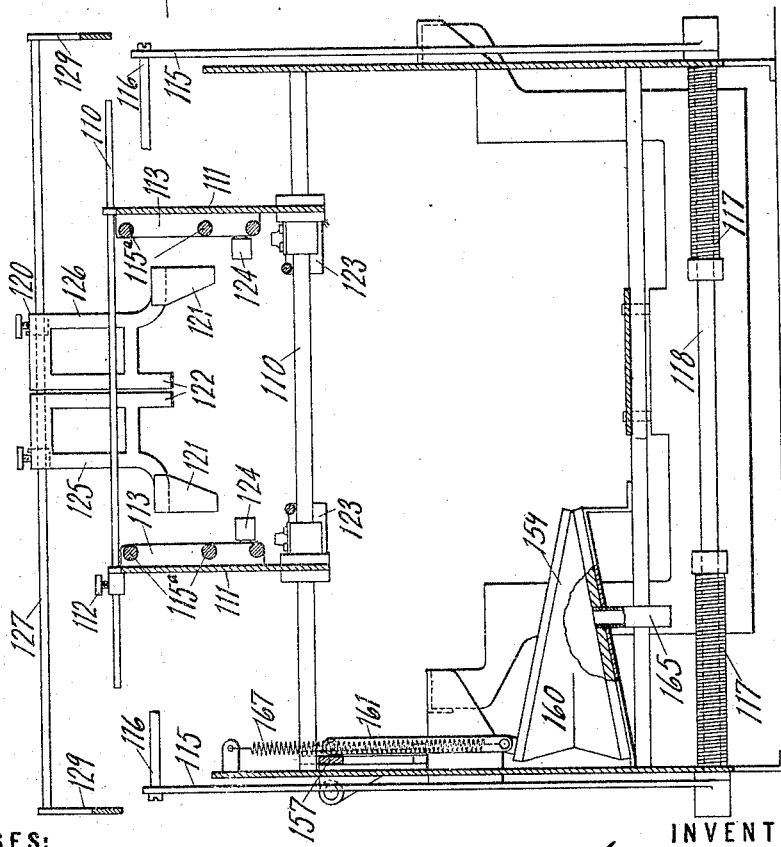
WITNESSES:
INVENTOR:

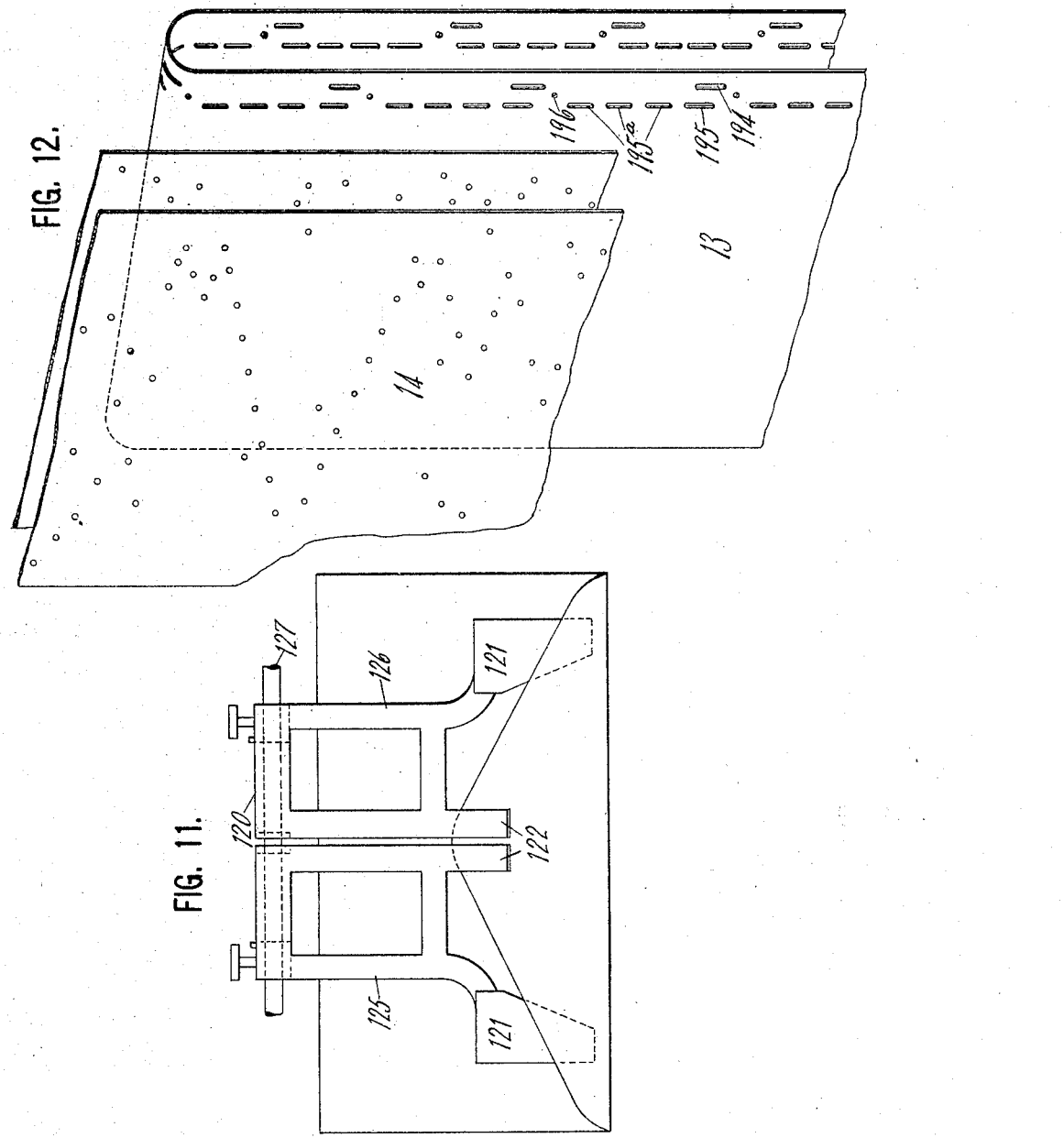

UNITED STATES PATENT OFFICE.

LYMAN R. ROBERTS, OF RUTHERFORD, NEW JERSEY, ASSIGNOR TO UNDERWOOD TYPEWRITER COMPANY, OF NEW YORK, N. Y., A CORPORATION OF DELAWARE.

AUTOMATIC TYPE-WRITER OPERATOR.

1,171,888.   Specification of Letters Patent.   Patented Feb. 15, 1916.

Application filed August 31, 1911. Serial No. 646,975.

*To all whom it may concern:*

Be it known that I, LYMAN R. ROBERTS, a citizen of the United States, residing in Rutherford, in the county of Bergen and State of New Jersey, have invented certain new and useful Improvements in Automatic Type-Writer Operators, of which the following is a specification.

This invention relates to an automatic typewriter operator particularly as adapted to addressing envelops, and is an improvement on the construction shown and described in Patent No. 1,109,597, granted September 1, 1914, to Charles L. Davis and me jointly.

The primary object of this invention is to control automatically all of the operations necessary to the addressing of envelops, such as feeding envelops to the typewriter, writing a series of names and addresses on successive envelops, and removing each completely addressed envelop from the typewriter. This object may be attained by providing an envelop feeder operated by a pneumatic actuator which is controlled from a master sheet passing over the tracker together with platen actuating means operated by an automatic pneumatic actuator controlled from the same master sheet, so as to rotate in a line-spacing direction to pick up the envelop fed to the platen and position the same ready for the first line of typewriting. The master sheet has openings corresponding to openings in the tracker which are connected to the envelop feeder actuator and to the line-spacing actuator, whereby when the openings in the master sheet are in register with the corresponding openings in the tracker, the actuators controlled thereby will be operated. Each of the actuators may embody a pneumatic motor, and a source of suction under the control of primary and secondary pneumatics, arranged so as to cause the operation of the motor when air is permitted to enter the chamber in the primary pneumatic normally under suction, by the bringing in register of openings in the master sheet with openings in the tracker.

The envelops, after once being fed and properly positioned on the platen, are imprinted with the desired name and address through the actuation of the typewriter keys automatically and pneumatically under the control of a second master sheet which is provided with openings corresponding to the keys desired to be actuated, which are adapted to be brought into register with similar openings in a tracker, which latter openings are connected with the primary pneumatics of the pneumatic actuators connected to means for operating each of the keys.

The shifting of the control of the operation of the machine from one master sheet and tracker to the other master sheet and tracker is controlled by perforations in the master sheets which operate to permit the excitation of certain pneumatic actuators which shift the driving connection from one master sheet to the other. When one master sheet is permitted to act at one time, then the dormant or inactive master sheet is brought into action by the active or working master sheet and concomitantly with the stopping of its own action.

The driving means for both of the master sheets can be disconnected simultaneously, so as to stop the operation of the machine not only by the provision of an aperture in the typewriting master sheet at the end of the list of names and addresses, but also by the using of all of the envelops which uncovers a control aperture, and further manually at the will of the operator. The automatic means may be controlled through an automatic pneumatic actuator which operates similar to the other pneumatic actuators under the control of a master sheet and the aperture uncovered by the last envelop. The manual means may consist of a hand-operated device adapted to manipulate certain mechanism connected to the driving gearing of the master sheet, so as to control the connection of said driving gearing irrespective of the control of the same by the automatic means. Connections may also be provided between the mechanism for disconnecting both of the master sheets from the driving mechanism and the means for returning the carriage at the end of the line, so as to disconnect the same, whereby when the machine is started up, the operation will be taken up exactly where it was left off without any danger of misplacement of the moving elements.

The work member, which in this instance is an envelope, may be removed or taken up from the platen, by providing movable elements, in this instance shown in the form of coöperating rolls and toothed disks which are adapted to project through the open bottom of a receptacle, shown in the form of a chute, so as to deliver the envelop into the chute. The chute may be manipulated to remove the envelop therefrom by connections which cause it to move concomitantly with the movement of the carriage. The motion in one direction may be caused by the action of a spring or equivalent element. The rolls and disks may be driven from the platen, so as to act concomitantly therewith.

Other objects and advantages will hereinafter appear.

Figure 2:
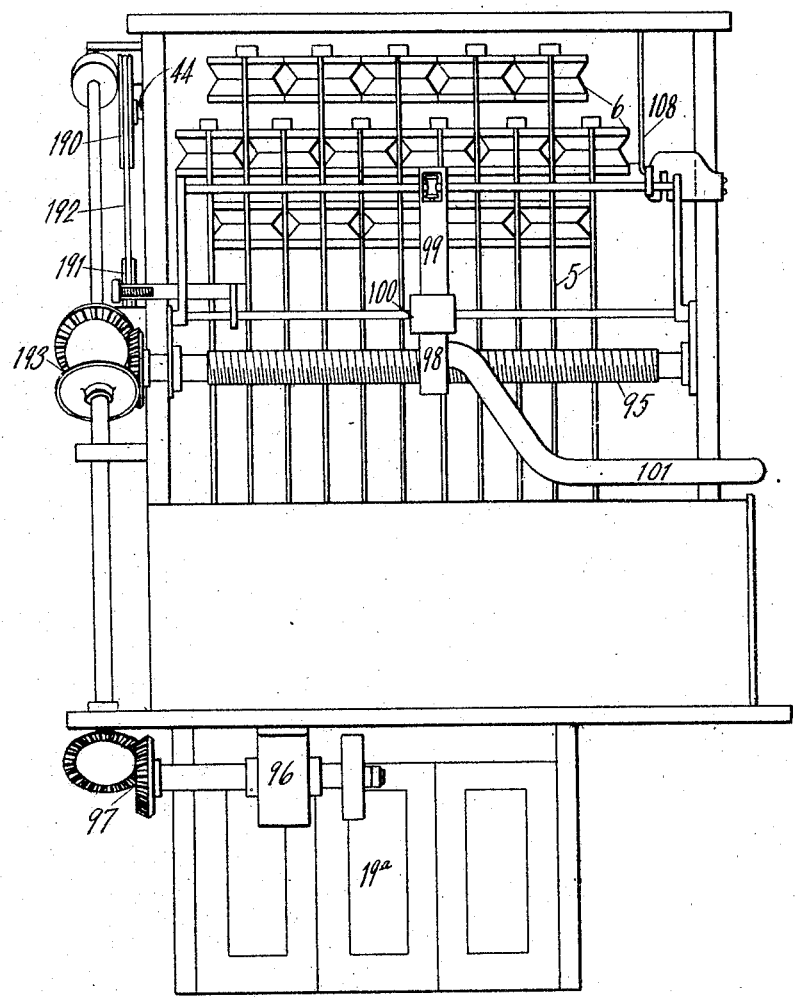

In the accompanying drawings, Figure 1 is a vertical section taken from front to rear of the machine. Fig. 2 is a front view in elevation with certain parts removed to show the underlying structure. Fig. 3 is a fragmentary perspective view. Fig. 4 is a vertical section through one of the pneumatics, showing the relative arrangement of the primary and secondary pneumatics. Fig. 5 is a fragmentary top plan view. Fig. 6 is an enlarged top plan view of the platen actuating mechanism. Fig. 7 is a detail view in elevation of the platen actuating mechanism. Fig. 8 is a detail view of the mechanism for shifting from one master sheet to the other by shifting the drive of said master sheets. Fig. 9 is a vertical section from right to left through the machine. Fig. 10 is an enlarged fragmentary perspective view of the chute for removing the envelop, and the mechanism for actuating the same. Fig. 11 is a detail front view in elevation of the clip for picking out a single envelop and feeding the same. Fig. 12 is a fragmentary perspective view of the two master sheets.

Referring more particularly to the special parts of this invention as shown in connection with an Underwood typewriter, 1 indicates the keys of the typewriter which actuate through intermediary mechanism type bars not shown, so that they strike on the front of the platen 2. The platen 2 is mounted to rotate on the carriage 3 in the usual manner, the latter being also mounted on ways provided on the typewriter frame 4, as is usual in the Underwood machine.

As described in the above-mentioned patent, the keys 1 are actuated automatically by power to in turn actuate the type bars. For this purpose, hammers 5 are manipulated by pneumatic motors 6, shown in the form of collapsible bellows, which form part of pneumatic actuators and are controlled by pneumatic controls each comprising a primary pneumatic 8 and a secondary pneumatic 9, the latter being controlled in its actuation by the former. Each of the primary pneumatics is connected by a conduit 10 to a plurality of trackers, of which two are shown at 11 and 12. These trackers are provided with the usual apertures, as is common in connection with the automatic pneumatic musical instruments, and the apertures are normally closed by master sheets 13 and 14, which are perforated at suitable intervals to actuate the keys 1 corresponding to the perforations, so that a letter or address, after having once been written, can be reproduced automatically by running one or both of the master sheets 13 and 14 over the trackers 11 and 12.

The air let into the primary pneumatic 8 in each instance by the registration of an aperture in one of the sheets with an aperture in one of the tracker boards, passes into a chamber 15; see Fig. 4, which is normally under suction or negative pressure by reason of a bleed-hole 16 in a flexible diaphragm 17, which forms a means of communication with the suction or vacuum chamber 18, which is held under suction normally by means of a suction pump 19$^a$ to which each pneumatic control is connected, and the vacuum chamber 18 is common to both the primary pneumatic 8 and the secondary pneumatic 9. When this registration of apertures occurs, the pressure of the atmospheric air below the diaphragm 17 will be greater than the sub-atmospheric pressure in the suction or vacuum chamber 18, so that the diaphragm 17, and the spindle 19 carried thereby, will be raised, whereby the chamber 20 normally in communication with the vacuum chamber 18, by means of a passage 21, will be cut off from communication therewith by a valve 22 on the spindle 19. This spindle 19 simultaneously opens up communication of the chamber 20 with the atmosphere, through the intermediary of a passage 23, by raising a valve 24 carried by the spindle 19. The chamber 20 is connected by a conduit 25 to a chamber 26 located beneath a diaphragm 27 in the secondary pneumatic 9. The upper surface of the diaphragm 27 is exposed to the suction or sub-atmospheric pressure of the chamber 18, so that when the chamber 20 is disconnected from the chamber 18, and connected up with the outside air, the pressure of the air will raise the diaphragm 27, and with it a valve spindle 28 which carries a valve 29, so that the latter will uncover a passage 30, permitting a chamber 31 to be connected with the suction or vacuum in the vacuum chamber 18. This chamber 31 is connected by means of a pipe 32 to the motor in each case, which is indicated in connection with the key-operating hammers by the numeral 6, so that the sides of the bellows motors are drawn together, whereby the member connected thereto may be actuated. After the position of the aperture on the master sheet passes beyond register with the aperture in the tracker board, the under side of the diaphragm 27 is once more connected with suction, so that it will be drawn down by reason of the weight of the valves thereon. In the movement downward of the valve spindle 28 connected to the diaphragm 27, a valve 33 will open a port 34, so that the bellows motor is momentarily connected with the atmosphere, so that it returns to its normal position; this port is cut off after this action by a second valve 35, which seats at the final downward movement in the spindle 28 and the diaphragm 27.

The master sheet 13 is supported on a roll 36, which is inset slightly with respect to the tracker 11, so that with the aid of a guide roll 37, the master sheet will be drawn tightly across the face of the tracker 11, permitting no air to creep into the openings, except through the proper openings in the master sheet. The roll 36 is engaged by a pressure roll 38, and the two may be locked together in driving relation by means of pinions 39 and 40. The pressure roll 38 and the pinion 40 connected therewith are supported on a rocker 41, whereby the pinion 40 may be manipulated to and from engagement with the pinion 39 concomitantly with a movement of the pressure roll 38 into and from engagement with the roll 36. The pressure roll 38 is provided at its opposite end with a gear 42 meshing with a drive gear 43 mounted on a shaft 44, which is shown in this case to form the pivot for the rocker 41. The master sheet 14 in a similar manner is supported by a supporting roll 45 and is stretched over the tracker 12 with the assistance of a roll 46. Roll 45 is provided with a pinion 47 meshing intermittently with a pinion 48 connected with a pressure roll 49, which is likewise provided with a gear 50 meshing with a drive pinion 51, which is mounted on a shaft 52 forming the pivot for a rocker 53 which supports the pressure roll 49 and the gear 48, and is capable of manipulating the same toward and from the roll 45 and the gear 47, so as to operatively connect and disconnect with the latter.

It may be noted that it is desirable to control the mechanism from only one master sheet at a time, and for this reason only one of the supporting rolls may be connected in driving relation with its driving mechanism at the same time. In order to shift from one master sheet to the other, there is provided a shifting lever 54 which is pivoted at 55, Fig. 8, and provided at its ends with rolls 56 and 57 engaging respectively with extensions of the rockers 41 and 53. These rolls 56 and 57 are adapted to be brought in connection with each of the rockers 41 and 53 to positions corresponding to the connected and disconnected positions of the rolls 38 and 49; these positions being determined by sockets 58 and 59 provided in each of the rockers 41 and 53. For the purpose of actuating the shifting lever 54 to connect and disconnect the master sheets in driving relation with the motive mechanism, there are provided plungers 60 and 61 which are actuated by bell cranks 62 and 63, which in turn are manipulated by pneumatic actuators 64 and 65 of a similar type to those described in connection with the key-actuating mechanism, and each embodying a pneumatic motor 66, a primary pneumatic 67, and a secondary pneumatic 68. The pneumatic actuator 64 which controls the plunger 60, and thus the connection of the gear 40 with the gear 39, is however controlled from the tracker 12, and the pneumatic actuator 65 which controls the meshing of the gears 47 and 48 is controlled from the tracker 11, that is to say, the conduits 69 and 70 which connect the primary pneumatics of the actuators to the trackers are crossed, whereby the active tracker and master sheet will render itself dormant, while it renders the previously dormant tracker and master sheet active.

It will be seen by reference to Fig. 8, that the plungers 60 and 61 actuate the lever 54 by abutting at their ends against pins 71 and 72 provided on the lever 54 on the opposite sides of its pivot 55. When the plungers have shifted the lever the desired amount, they are automatically disconnected from the pins 71 and 72 by the provision of inclined cams 73 on their under surfaces, which engage guide rods 74, so that for the remainder of the stroke of the plungers, they can pass over the tops of the pins 71 and 72.

In Fig. 8, the parts are in the position in which the plunger 61 has just shifted the lower end of the lever 54 toward the left, permitting the gear 48 to mesh with the gear 47 and disconnecting the gear 40 from the gear 39.

If it is desired to disconnect both of the supporting rolls 36 and 45 from driving relation with the driving gear so that neither of the master sheets will operate, as for example, when it is desired to stop the machine, a button or other actuating means 75. Fig. 1, is secured to a rocker 76, which is provided with a pin 77 engaging an arm 78 secured to a shaft 79. The pin 77 may, on the complete actuation thereby of the arm 78, engage a locking notch 80, so as to secure the parts in their disconnected position. The shaft 79 has also secured thereto a bell crank lever 81, one arm of which is connected by a link 82 to a bell crank 83 having a limited relative movement by engaging in the slot therein. This bell crank lever 83 underlies the roll 38, so that the lever lifts the same from engagement with the roll 36, and simultaneously lifts the gear 40 from mesh with the gear 39. The bell crank lever 83 is connected to a similar bell crank lever 84 by means of a link 85, which latter bell crank lever underlies the roll 49, so as to concomitantly disconnect the roll 49 from coöperative engagement with the roll 45, and also disconnect the gear 48 from mesh with the gear 47 at the time of the disconnection of the roll 38 from the roll 36. The disconnection of both of the driving sets for the master sheets, when active, may also be controlled from the trackers 11 and 12. For this purpose, there is provided a pneumatic actuator 86 of the type above described including a pneumatic motor 87, a secondary pneumatic 88, and a primary pneumatic 89, the last of which is connected to an aperture in the tracker 12 by means of a conduit 90. Inasmuch as this pneumatic actuator acts similar to the others, it will be seen that when an aperture corresponding to this actuator is in alinement with an aperture in the master sheet, the bellows motor 87 will be contracted, so that a projection 91 provided thereon will engage a shoulder on a latch 92, so as to draw down on the arm 78 to which the latch 92 is pivoted. An aperture for this purpose may be provided at the end of a list of names on the master sheet, so as to disconnect the driving mechanism to the machine when all of the names have been used up. The latch 92 is normally held in coöperative relation with respect to the projection 91 by means of a spring 93, but is capable of being moved from coöperative relation therewith by a reverse throw of the button 75 through the intermediary of a pin 94 on the upper arm of the rocker 76.

Considering for a moment the means for returning the carriage 3, it will be seen that there is provided a constantly rotating screw 95, which is rotated by the motor 96 through the intermediary of the connecting gearing 97, as described in the above-mentioned patent. This screw 95 may be engaged intermittently by a half nut 98 on a connector 99, shown in the form of a lever pivoted at 100. The connector 99 slides along with the carriage, and is adapted to return the same by having a hook 101 which engages the usual platen and carriage shifting lever 102 with a lost motion connection to allow for play. The connector 99 is manipulated through a pneumatic actuator 103 through the intermediary of a plunger 104 which acts similar to the plungers 60 and 61, and is connected to the actuator 103 by the linkage 105. The actuator 103 is similar to the other actuators above described, and may be controlled from the trackers 11 and 12 in a similar manner.

It will be seen that when both of the master sheets are inoperative by reason of the fact that both of the driving sets are disengaged, it would be advisable to disconnect the carriage return mechanism at the same time, so as to prevent any inaccurate operation of the machine. For this purpose, the connector 99 is connected to one arm 106 of the bell crank lever 81 on the shaft 79 through the intermediary of the links 107 and 108 and the bell crank lever 109.

Of course, it is to be understood that similar to the patent above mentioned, one of the master sheets can be used for the address and the other for the body of the letter, but in this case, I have shown the master sheets as adapted to address envelops, one of them being used to feed and place the envelop, and the other to do the typewriting on the envelop.

For the purpose of holding the envelops, there is provided a frame 110 on which are slidably mounted a pair of side plates 111, which are adjustable toward and from each other by sliding on the rods of the frame 110, so as to allow for envelops of different lengths. The side plates 111 may be locked in any adjustable position by means of the set screws 112. The side plates 111 have inwardly projecting flanges 113, which are spaced apart from each other and form supporting means for guiding rolls 124, which retain the package of envelops placed behind them.

The package of envelops is pressed toward the flanges 113 by one or more back plates 114 slidingly mounted on the frame 110, as by having apertures through which extend rods 115ᵃ of the frame 110. The back plates 114 are pressed forward by arms 115 through the intermediary of linkages 116. These arms 115 are actuated by springs 117 wound on a shaft 118. By this arrangement, as each envelop is removed and fed to the platen 2, the space previously occupied thereby will be taken up by the forward movement of the back plates 114.

For the purpose of removing the foremost envelop from the pack to feed it to the platen 2, there is provided a feeder 119 which embodies a clip 120 of a form more clearly seen in Figs. 1, 3 and 11. The envelops are stacked with the flaps down and facing toward the rear of the machine, that is, toward the master sheets, so that blades 121 provided on the clip 120 can pass between the flap and the body of the envelop, and engage the bottom of the crease, thus acting to force the envelop down. In order that the flap may not open out relative to the body portion of the envelop, the clip is provided with retainers 122, which are shown in the form of springy strips curving outwardly at their lower edges, so as to pass outside of the flap of the envelop adjacent the apex thereof, while the blades pass inside the flap of the envelop adjacent the ends thereof. It will be seen that this provides an almost positive grip which will strip a single envelop from the pack. This action is aided by guards 123 which are so located relative to the front flanges 113 and guiding rolls 124 which project beyond the flanges 113, that all of the envelops, with the exception of the exposed one, will be supported by the guards 123. The clip 120 may be formed in two sections or wings 125 and 126, pivotally secured to a rod 127 and normally held in tight contact with the pack of envelops by means of springs 128 each secured at one end to the rod 127, and at its other end to a section of the clip 120.

The rod 127 forms a portion of the feeder 119, and in this instance is shown to be located adjacent the forward end of two arms 129 which support it and swing it to and fro, so as to manipulate the clip 120. These arms are secured at their opposite ends to a shaft 130 provided with an arm 131, so that the combination of the rod 127, the arms 129, the shaft 130, and the arm 131 forms a bell crank lever. This bell crank lever may be manipulated from a pneumatic actuator 132 through the intermediary of a link 133 which connects the arm 131 with the pneumatic motor 134 of the pneumatic actuator. This motor 134 is controlled in the usual way by a pneumatic control embodying primary and secondary pneumatics 135 and 136, the latter of which is connected to the motor 134 by a conduit 137. The primary pneumatic 135 is connected by a conduit 138 to the tracker 11, where it is provided with a suitable aperture so that the envelop feeder can be controlled from the master sheet 13 and the tracker 11. The return movement of the feeder 119, and thus of the bell-crank lever embodied in the feeder, is caused by one or more springs 139 provided on the shaft 130. This return movement may be limited by a stop 140 (see Figs. 1 and 5) which is shown to embody an arm 141 secured to a shaft 142, and provided with a pin 143 which projects over the arm 131 of the feeder 119.

It is desirable to have the platen 2 rotating when the feeder 119 deposits an envelop in juxtaposition to the platen, so that the platen can automatically feed up the envelop and position it ready for the address to be imprinted thereon. For this purpose, as will be seen by reference to Figs. 1, 6 and 7, the platen or its shaft, indicated at 144, is provided with a feeding ratchet wheel 145, which is engaged by a pawl 146 on an actuating lever 147, mounted to rotate on the shaft 144, so that when the lever 147 is actuated, the actuator 145 will be rotated in one direction, the teeth and the pawl being so arranged that during the return movement the pawl will slip over the teeth without actuating the ratchet wheel 145 and the platen: this actuation being permitted by a spring 148, which yieldingly holds the pawl 146 in engagement with the teeth of the ratchet wheel 145. In order to prevent overthrow of the platen from this actuating mechansim, there is provided a second locking ratchet wheel 149, having its teeth faced in the opposite direction from that of the teeth on the ratchet wheel 145, and engaged by a locking detent 150, shown in the form of a pivotally mounted arm having a tooth adapted to engage the teeth on the ratchet wheel 149, and normally held out of engagement therewith by means of a spring 151. The motion of the detent, due to the spring 151, is limited by a stop 152.

It will be seen that the detent 150, at the end of the desired stroke of the actuating lever 147, will be engaged by the latter, so that the tooth on said detent will engage the teeth of the locking ratchet wheel 149, and prevent further rotation of the shaft 144 and platen 2, through the agency of the lever 147 and the pawl 146. In order that the point of locking may be adjusted, the detent 150 may be provided with an adjustable head 153, shown in the form of a bracket adjustably secured on the detent by a bolt and slot connection 154. In this instance the head 153 is shown as being engaged by a member 155 projecting sidewise from the lever 147. This member 155 may be in the form of a roll and may be utilized as the contacting member through which the actuating mechanism for the lever 147 engages the latter.

The lever 147 is returned from its down stroke by means of a spring drum, indicated diagrammatically at 156. The actuating mechanism for the lever 147, and thus for the platen rotating means, elevates a lever 157 mounted to rotate on the shaft 142 and provided at its free end with an extension 158, which is adapted to engage the roll 155 when the carriage is located in its return position ready to receive a fresh envelop. The lever 157 is itself manipulated by a pneumatic actuator 159, the pneumatic motor 160 of which is connected to the lever 157 by a link 161. This pneumatic actuator also embodies the usual pneumatic control 162 comprising primary and secondary pneumatics 163 and 164, the latter of which is connected to the motor 160 by a conduit 165, and the former of which is connected by a conduit 166 to the upper tracker 11, so that it can be controlled from the master sheet 13. The return motion of the lever 157 after the manipulation by the pneumatic actuator, is caused by a spring 167.

We have thus far seen how the envelop is fed to the platen and how the typewriting keys are actuated to print the address on the envelop, and it now remains to show how the envelop is carried away after having had the address placed thereon.

The envelop coming from the platen 2, because of the rotation of the same, is stripped from the platen by a guide 168, where it is caught by one or more pairs of feeding rolls 169 and 170 mounted on shafts 171 and 172. These shafts are provided with intermeshing gears 173 and 174, one of which engages an idler 175 meshing with a gear 176 connected so as to rotate with the platen 2, as for example, by being secured to the platen shaft 144. One of these shafts, for instance, the shaft 172 may be provided with one or more preferably toothed disks 177 which are adapted to catch the envelop and give it a final throw on leaving the opposed rolls 169, 170. For the purpose of catching the envelop as it leaves these rolls, there is provided a receptacle 178, shown in the form of a chute movable to a position adjacent the rolls 169 and 170, so that the final action of the disks 177 will flip the envelops into the receptacle 178. This receptacle is shown in the form of a chute open at the bottom, as seen more clearly by reference to Figs. 1 and 5, so that the chute can be depressed beyond the upper surface of the rolls and the disks. The chute 178 is shown as being secured to a shaft 179, which is provided with a spring 180 and tending normally to turn the shaft 179, so as to raise the chute from its depressed position, indicated in Fig. 1, to its tilted position, indicated in Fig. 3. The movement of the chute 178 in the opposite direction, against the tension of the spring 180, is caused by the carriage 3 itself, which is provided with a stop 181 for this purpose. This stop engages a roll 182 on an arm 183 mounted on a shaft 184. The motion of the arm 183 is transmitted to the shaft 179, and thus to the chute 178 through the intermediary of a link 185, which is pivotally connected to the arm 183 at one end, and to an arm 186 secured to the shaft 179.

The roll 182, and thus the arm 183, does not follow the carriage during its complete movement toward the left, but only for a distance sufficient to raise the chute 178 to the angle shown in Fig. 3 sufficient that an envelop will slide from the chute into a receptacle provided for the purpose beneath the outward end of the chute. The means for limiting this movement may be of any suitable character, and in this instance is shown in the form of a stop bracket 187 which projects in the path of the arm 183.

It may be noted in passing that the movement of the chute 178 is intermittent, due to the intermittent step-by-step letter-feeding movement of the carriage 3, so that besides being tilted up, the chute is submitted to a jigging motion, which aids in sliding the envelop from the chute.

When the last envelop has left the holder provided for the pack of envelops, it may be desirable to stop the printing mechanism, so as to give the operator time to put more envelops in the holder. For this purpose, there may be provided in one of the back plates 114 a controlling aperture 188 similar to the apertures in the tracker, and which is normally covered when one or more envelops are in the holder for the pack. This aperture is normally under suction, inasmuch as it is connected by a conduit 189 to the conduit 90, and thus to the primary pneumatic 89 of the pneumatic actuator 86.

It will be seen that when the last envelop passes from the holder, the pneumatic motor 87 of the pneumatic actuator 86 will be open to the suction of the suction pump 19$^a$. As previously explained above, the projection 91 thereon will pull down on the latch 92, and thus raise both of the rolls 38 and 49, through the intermediary of the connecting mechanism, as above described, so that both of the master sheets will be rendered inactive.

If it is not desired to place more envelops in the holder, and yet it is desired to print an address on the last one, the pneumatic motor 87 may be left contracted, and the master sheet 14 driven, by rotating the button 75 in the reverse direction, whereby the pin 94 will release the latch 92 from engagement with the projection 91, so that the actuation of the parts will turn the roll 49 into engagement with the upper surface of the master sheet 14, at which time the gears 48 and 47 may complete the driving connection.

The shafts 44 and 52, whereby the supporting rolls for the master sheets are indirectly driven, may themselves be driven by being provided with pulleys 190 and 191 connected by a belt 192, one of these pulleys being utilized as a friction disk and connected in driving relation with the motor 96 through the intermediary of the gearing 97 and gearing 193 connected in driving relation therewith.

Considering the operation of the device, the master sheet 13 may be utilized to control the envelop feed, and the master sheet 14 may be utilized to control the printing of the address on the envelop after it has once been placed in position on the platen.

Referring to Fig. 12, it will be seen that there is in the master sheet 13 provided an aperture 194 which is so located as to come into register with the aperture in the tracker 11, which is connected to the conduit 138 and thus to the pneumatic actuator 132. When the opening 194 thus comes in register with the aperture in the tracker 11, it admits air to the under side of the diaphragm in the primary pneumatic, raising the same, so as to admit air, as described in connection with Fig. 4, to the under side of the diaphragm in the secondary pneumatic, whereby the pneumatic motor 134 of the pneumatic actuator 132 is connected to the suction or negative pressure caused by the suction pump 19ª. This causes the arm 131 of the envelop feeder 119 to be drawn down on against the tension of the spring 139, so that the blades 121 on the clip 120 pass inside of the flap of the envelop, that is to say, between the flap and the body of the envelop, while the retainers 122 pass outside of the flap, so that a positive hold is obtained by the clip, whereby during the downward motion of the latter the exposed envelop will be slipped by the edges of the guards 123 and dropped to a position where it can be caught up by the platen 2.

It will be noted by referring back to Fig. 12, that an aperture 195 is provided which overlaps the aperture 194, and this aperture is used to control the rotation of the platen 2, so that as the envelop comes to the platen, the latter will be rotating, tending to bring the envelop to the proper position.

Besides the aperture 195, there are provided a plurality of similarly located apertures 195ª, each of which is adapted to give an additional rotation to the platen 2 to bring the envelop to a proper position for the final lines of the address to be imprinted thereon. As described above, the apertures 195 and 195ª are adapted to come in register with a corresponding aperture in the tracker 11, which aperture is connected to the conduit 166 and thus to the primary pneumatic 163 of the pneumatic actuator 159. This will cause the pneumatic motor 160 of the pneumatic actuator 159 to collapse by connecting it with the suction, so that the arm 157 will be drawn down on against the tension of the spring 167, whereby the extension 158 will engage the roll 155 on the actuating lever 147, depressing it against the tension of the spring drum 156 until its motion is limited by engagement with the head 153 which causes the detent 150 to lock with the ratchet wheel 149, thus preventing further rotation of the platen through the intermediary of the ratchet wheel 145 and the pawl 146 connected to the lever 147.

There will be one actuation of the platen-rotating or line-spacing mechanism for each of the apertures 195 and 195ª, and when the envelop has been thus manipulated to the proper position ready for the first line of typewriting of the address, the master sheet 13 will be moved to a position such that an aperture 196 provided therein will come opposite an aperture in the tracker 11 corresponding to the conduit 70 which is connected to the primary pneumatic 67 of the pneumatic actuator 65. This will cause the pneumatic motor 66 of the pneumatic actuator 65 to be collapsed to the position indicated in Fig. 8, whereby the plunger 61 will force the lever 54 over into the position shown in Fig. 8, so that the gear 40 is drawn out of mesh with the gear 39, and the gear 48 is put in mesh with the gear 47, thus shifting the drive, and shifting the control from the master sheet 13 to the master sheet 14. The master sheet 14 will then bring the apertures successively in front of the corresponding apertures in the tracker 12, so that the key actuators will manipulate the corresponding keys, through the intermediary of the hammers 5. The carriage will be returned at the end of each line through the pneumatic actuator 103 which connects the carriage to the constantly rotating screw-shaft 95, through the intermediary of the connector 99, the hook 101 and the platen or line-space lever 102. The carriage is thus returned and the platen rotated for line-spacing concomitantly at the end of the line under the control of the master sheet 14.

When the address is completed, a number of apertures may be provided for shifting the connector 99 into engagement with the constantly rotating screw-shaft 95, whereby the platen 2 will be rotated to feed the envelop into the clutches of the rolls 169 and 170, and the tooth disks 177. Inasmuch as the chute 178 has been depressed by the return motion of the carriage to a position such that the rolls 169 and 170 project through the bottom thereof, a final flip of the envelop by the tooth disks 177 will deposit the envelop in the chute 178. The return of the carriage has placed the roll 155 under the extension 158 on the arm 157 ready to be actuated thereby. At this point an aperture in the master sheet 14 corresponding to the aperture connected to the conduit 69 will come in register with said latter aperture, so that the pneumatic motor 66 of the pneumatic actuator 64 will be collapsed, causing the plunger 60 to shoot forward and manipulate the lever 54 from the position occupied in Fig. 8 to a position such that the gear 40 will mesh with the gear 39, and the gear 48 will be drawn from engagement with the gear 47, thereby shifting the control from the master sheet 14 back to the master sheet 13, so that a fresh envelop will be fed to the platen. The operation is continued, the control being alternately shifted from one master sheet to the other, so that a fresh envelop is fed after each envelop has been inscribed with an address and removed from the platen.

It is to be understood that while the device is specifically described in connection with envelops to be inscribed with names and addresses, the invention is not limited to such use. It might, for example, with slight modifications, be used for cards or other like work members. Also some form of work members other than envelops might be used without any change in the specific form of mechanism illustrated. The term "envelop" therefore may be considered to include any such work member.

Variations may be resorted to within the scope of the invention, and portions of the improvements may be used without others.

Having thus described my invention, I claim:

1. The combination, with typewriting mechanism, including a platen; of a feeder to positively engage and carry envelops near to said platen; an actuator for rotating said platen; and means separate from and independent of said actuator for operating said feeder, the rotation of said platen by said actuator being concomitant with the feeding action of said feeder, so that the envelops will be positively manipulated to a predetermined position on the platen corresponding with the proper placement of the first line of typewriting by said typewriting mechanism on said envelops.

2. The combination, with typewriting mechanism, including a platen; of a feeder to positively engage and carry envelops near to said platen; an actuator for rotating said platen; and fluid-actuated, master-sheet-controlled means for actuating said feeder and said actuator concomitantly, so that the envelops will be positively manipulated to a predetermined position on the platen corresponding with the proper placement of the first line of typewriting by said typewriting mechanism on said envelops.

3. The combination, with typewriting mechanism including a platen; of a feeder to positively engage and carry envelops near to said platen; an actuator for rotating said platen; means for controlling the concomitant action of said feeder and said actuator, so that the envelops will be positively manipulated to a predetermined position on the platen corresponding with the proper placement of the first line of typewriting by said typewriting mechanism on said envelops, and removing mechanism for taking the envelops from said platen after the typewriting thereon has been completed.

4. The combination, with typewriting mechanism, including a platen; of a feeder to positively engage and carry envelops near to said platen; an actuator for rotating said platen; pneumatic means for actuating said feeder and said actuator concomitantly, so that the envelops will be positively manipulated to a predetermined position on the platen corresponding with the proper placement of the first line of typewriting by said typewriting mechanism on said envelops; removing mechanism for taking the envelops from said platen after the typewriting thereon has been completed; and means for actuating said removing mechanism concomitantly with the rotation of said platen.

5. The combination with typewriting mechanism including a platen, of a feeder to positively engage and carry envelops to said platen, an actuator for said feeder, means for rotating said platen, and an actuator for said means, said actuators being automatically controlled from a single master sheet to act concomitantly so that an envelop will be fed to said platen and properly placed by the rotation of said platen in a position to receive the first line of typewriting by said typewriting mechanism.

6. The combination with typewriting mechanism including a platen, of a feeder to positively engage and carry envelops to said platen, a pneumatic actuator for said feeder, a pneumatic actuator for rotating said platen, and a tracker connected to both of said actuators, whereby the passing of a perforated master sheet over said tracker will automatically control the concomitant operation of both actuators, so that said feeder and platen will be manipulated concomitantly to place an envelop in position to receive typewriting by said typewriting mechanism.

7. The combination with an envelop-holder, of a feeder for removing the envelops from said holder, and an actuator for said feeder, said feeder including a bell crank lever and a clip, the latter being constructed to engage both between the flap of the envelop and the body portion and outside the flap of the envelop.

8. The combination with an envelop-holder, of a feeder for removing the envelops from said holder, and an actuator for said feeder, said feeder including a bell crank lever and a clip, the latter embodying one or more sections having blades adapted to engage between the flap and the body portion of the envelop, and also having retainers adapted to extend on the opposite side of the flaps and said blades and forming with said blades gripping means to afford a positive grip of the envelop.

9. The combination with an envelop-holder, of a feeder for removing the envelops from said holder, an actuator for said feeder, said feeder including a bell crank lever and a clip, the latter being constructed to engage both between the flap of the envelop and the body portion and outside the flap of the envelop, and spring means urging said clip in contact with said envelops.

10. The combination with a holder adapted to hold a pack of envelops, of a feeder for stripping a single envelop at a time from the pack, including a lever, and a clip movably connected to said lever and formed to grip an envelop, an actuator for said feeder, and means for returning said feeder to its normal position after having been manipulated by said actuator.

11. The combination with a holder for a pack of envelops, of a feeder comprising means to grip an envelop flap on opposite sides and strip a single envelop at a time from said pack, an actuator, means to return said feeder to its normal position after a manipulation by said actuator, and a stop for limiting the movement of said feeder.

12. The combination with a holder for holding a pack of envelops, of a feeder for stripping a single envelop from said pack, a pneumatic actuator for said feeder, pneumatic means for controlling the operation of said actuator, and a control actuated on the removal of the last envelop from said holder for interrupting the action of said pneumatic means, whereby the feeding movement of said feeder will be stopped when the envelops are exhausted in said holder.

13. The combination with an envelop holder for holding a pack of envelops, of a feeder for stripping a single envelop from said pack, said feeder including a lever, a clip pivotally connected to said lever, and springs for normally urging said clip in engagement with said pack of envelops, said clip embodying a plurality of sections, each provided with a blade to be inserted between the flap and the body portion of the envelop and with a retainer adapted to pass on the opposite side of the flap of the envelop from said blade, and actuating means for said feeder.

14. The combination with a holder for holding a pack of envelops, of a feeder for stripping the envelops from said pack, pneumatic means for actuating said feeder, said holder having a movable back plate for following up the last envelop in the pack, and controlling means governed at said back plate, normally shut off by the last envelop in the pack, and rendered operative by the removal of the last envelop, to interrupt the action of said pneumatic means, whereby the operation of said feeder will be stopped.

15. The combination with typewriting mechanism including a carriage, and a platen on the carriage, of means for removing a work member from said platen, and operating connections enabling the coöperation of said means and said carriage, whereby the movement of said carriage will control said means.

16. The combination with typewriting mechanism including a carriage, and a platen on the carriage, of means for removing a work member from said platen, operating connections enabling the coöperation of said means and said carriage, whereby the movement of said carriage will control said means, and connections between certain parts of said means and said platen, whereby the movement of said platen will control the movement of certain parts of said means.

17. The combination with typewriting mechanism including a carriage provided with a platen, of means for removing a work member from said platen, said means including rotatable members driven concomitantly with the movement of said platen and a holder to receive the work member, and connections for controlling the movement of said holder concomitantly with the movement of said carriage.

18. The combination with typewriting mechanism including a traveling carriage and a platen, of automatically controlled actuating means for rotating said platen, and means for removing a work member from said platen, said last-mentioned means including movable elements actuated concomitantly with the movement of said platen and additional elements actuated concomitantly with the travel of the carriage.

19. The combination with typewriting mechanism including a platen, of automatically controlled actuating means for rotating said platen, means for removing a work member from said platen, said last-mentioned means including rotatable members driven from said platen, a receptacle for receiving the envelop from said rotatable members, and means to discharge the envelop from said receptacle.

20. The combination with typewriting mechanism including a carriage having a platen, of means for removing a work element from said platen, said means including a chute movable toward and from said platen, and connections for controlling the movement of said chute concomitantly with the movement of said carriage.

21. The combination with typewriting mechanism, including a platen; of automatic means for operating said typewriting mechanism; means for withdrawing the typewritten work members from said platen; connections for operating said withdrawing means from said automatic means; and means for discharging the withdrawn work members.

22. The combination, with typewriting mechanism; including a platen; of automatic means for operating said typewriting mechanism; means for withdrawing the typewritten work members from said platen, said withdrawing means comprising movable elements adapted to seize the work members; connections for operating said withdrawing means from said automatic means; a receptacle adapted to receive the work members from said movable element; and means to automatically discharge the work members from said receptacle.

23. The combination with typewriting mechanism including a platen, of a pair of rolls for taking a work member from said platen, one or more toothed disks connected to one of said rolls and adapted to give a final flip to the work member taken from said platen, means for driving said rolls and said disks, a receptacle for receiving the work member from said rolls, and means for actuating said receptacle to discharge the work member therefrom.

24. The combination with typewriting mechanism including a carriage and a platen, of a chute for receiving a typewritten work member from said platen, and connections between said chute and said carriage for depressing said chute in juxtaposition to said platen.

25. The combination with typewriting mechanism including a carriage and a platen, of a chute for receiving a typewritten work member from said platen, connections between said chute and said carriage for depressing said chute in juxtaposition to said platen, and spring means for tilting said chute, whereby a work member coming thereinto, when said chute is in juxtaposition to said platen, will be removed therefrom.

26. The combination with typewriting mechanism including a carriage and a platen, of a chute for receiving a typewritten work member from said platen, connections between said chute and said carriage for depressing said chute in juxtaposition to said platen, spring means for tilting said chute, whereby a work member coming thereinto, when said chute is in juxtaposition to said platen, will be removed therefrom, and movable elements for taking the work member from said platen and depositing it in said chute.

27. The combination with typewriting mechanism including a carriage and a platen, of a chute for receiving a typewritten work member from said platen, connections between said chute and said carriage for depressing said chute in juxtaposition to said platen, spring means for tilting said chute, whereby a work member coming thereinto when said chute is in juxtaposition to said platen, will be removed therefrom, movable elements for taking the work member from said platen and depositing it in said chute, and driving connections between said moving elements and said platen, whereby said moving elements may be driven from said platen.

28. The combination with typewriting mechanism including a carriage and a platen, of rotatable rolls for removing a work member from said platen, a chute having an opening in the bottom thereof, whereby it may be depressed over said rolls, to receive the work member therein, means for driving said rolls, and means for operating said chute.

29. The combination with typewriting mechanism including a carriage and a platen, of rotatable rolls for removing a work member from said platen, a chute having an opening in the bottom thereof, whereby it may be depressed over said rolls, to receive the work member therein, driving connections between said rolls and said platen, and operating mechanism enabling the movement of said chute to be controlled from said carriage.

30. The combination with typewriting mechanism including a carriage and a platen, of a chute movable to a position in juxtaposition to said platen, so as to receive a work element from said platen, a spring normally tending to raise said chute out of juxtaposition to said platen, and connections whereby a return movement of said carriage will act against said spring to depress said chute into juxtaposition to said platen.

31. The combination with typewriting mechanism including a carriage and a platen, of a chute movable to a position in juxtaposition to said platen, so as to receive a work element from said platen, a spring normally tending to raise said chute out of juxtaposition to said platen, a stop on said carriage, an arm adapted to be engaged by said stop, and connections between said arm and said chute whereby said chute is moved against the tension of said spring to a position adjacent said platen.

32. The combination with a typewriting machine having a carriage traveling from side to side, said carriage having a rotary platen mounted thereon, of automatic means for taking the typewritten work members as they come from said platen and delivering them off to one side of the machine; said automatic means having its action controlled by the travel of said carriage.

33. The combination with a typewriting machine having a carriage traveling from side to side, said carriage having a rotary platen mounted thereon, of automatic means for taking the typewritten work members as they come from said platen and delivering them off to one side of the machine; said automatic means having its action controlled by the travel of said carriage and the rotation of said platen.

34. The combination with a typewriting machine having a platen, of a chute having an opening in the bottom thereof to receive work members as they come from said platen, and means to cause the work members to be discharged from the chute.

35. The combination with a typewriting machine having a platen, of a chute having an opening in the bottom thereof to receive work members as they come from said platen; said chute being positioned to have an incline off to one side so that the work members coming therein can be carried by gravity off to one side of the machine.

36. The combination with a typewriting machine, of automatic means for actuating parts of said typewriting machine, a feeder for supplying work members to said typewriting machine, a magazine for holding the work members in position to be fed by said feeder, said magazine having a movable back plate, a controlling device connected to said back plate actuated by the removal of the last work-member from said magazine and acting to silence said actuating means, and means for maintaining said back plate and said controlling device always in engagement with the last work-member in said magazine as the work members are taken one at a time from said magazine by said feeder so that said device will be passive so long as a work member remains in said magazine.

37. The combination with a typewriting machine, of automatic means for actuating said typewriting machine, a magazine for holding work-members to be supplied to said typewriting machine, an automatic feeder for supplying the work members from said magazine to said typewriting machine, a controlling device, means controlled by said device for silencing said automatic actuating means, said device having an opening normally covered by the last work-member in said magazine, and means whereby said last work-member is maintained against said opening as the work members are fed forward in said magazine.

38. The combination of a work-member receiving-chute having one side higher than the other to discharge the work-members, and means to move the chute to a substantially level position to receive the work-members.

39. The combination with a carriage having a platen, of a chute for taking work-members away from the platen, and mechanism between the carriage and chute whereby the chute is actuated by the carriage.

40. The combination with a typewriting mechanism including a platen, of a device movable toward and from said platen to receive work-members from said platen, and means to transfer the work-members from the platen and deposit them on said receiving device while the latter is inactive.

41. The combination of a holder for work-members comprising a movable back plate having an opening therein normally covered by the final work-member in a pack, mechanism for feeding work-members from said holder, means for keeping said final work-member covering said opening as it moves along, and pneumatic means controlled by said opening for actuating said mechanism.

42. In a typewriting machine, the combination with a traveling carriage, of a receptacle supported independently of the carriage, means to transfer a work-sheet from the carriage to said receptacle, and means to move said receptacle into and out of position to receive the work-sheet.

43. In a typewriting machine, the combination with a traveling carriage, of a receptacle supported independently of the carriage, means to transfer a work-sheet from the carriage to said receptacle, and means controlled by the travel of the carriage for discharging the work-sheet from said receptacle.

44. In a typewriting machine, the combination with a traveling carriage, of a receptacle supported independently of the carriage and movable into position to receive work-sheets from the carriage, and means controlled by the movement of the carriage for actuating said receptacle to discharge the work-sheets therefrom.

45. In a typewriting machine, the combination with a traveling carriage and a rotary platen thereon, of a device extending along the platen in a position to receive a work-sheet discharged from the platen, and means to tilt said device into position to discharge the work-sheet.

46. In a typewriting machine, the combination with a traveling carriage and a rotary platen mounted thereon, of a receptacle adapted to be tilted about an axis transverse to the platen axis, and means to tilt said receptacle from a work-sheet-receiving position to a position in which the work-sheets are discharged by gravity.

47. In a typewriting machine, the combination with a traveling carriage and a rotary platen thereon, of a receptacle supported on an axle transverse to the direction of the carriage travel, a spring normally holding the receptacle in an inclined position, and compensating means enabling the receptacle to move to a horizontal position for receiving a work-sheet when the carriage is at one limit of its travel.

48. The combination with type writing mechanism including a platen, of an oscillatory feeder for engaging and carrying envelops to said platen, an actuator for rotating said platen to take the envelop as it comes to the same, and feed it around to bring the proper portion of the envelop in register with the printing point of the typewriting mechanism, independent drives for said feeder and said actuator, and controlling means enabling the concomitant action of said drives so that the actuator will come into play in time to enable the platen to take the envelop from the feeder and properly position the envelop on the platen.

49. The combination with typewriting mechanism including a platen, of an oscillatory feeder for engaging and carrying envelops to said platen, an actuator for rotating said platen to take the envelop as it comes to the same and feed it around to bring the proper portion of the envelop in register with the printing point of the typewriting mechanism, independent drives for said feeder and said actuator, and contro ling means for said actuator and said feeder including a perforated master sheet having a perforation corresponding to the actuation of said feeder and a series of perforations corresponding to the action of said actuator, said last-mentioned perforations trailing said first-mentioned perforation whereby the feeder will bring the envelop to the platen and the platen will be rotated to properly position the envelop brought thereto on the platen so as to bring the first line to be written on to the printing point of the typewriting mechanism.

50. The combination with a traveling typewriter carriage moving from side to side, of a rotatable platen mounted to travel with the carriage and having a rotation relative to said carriage to enable a line spacing of the work-member on said platen, a feeder for supplying work-members to said platen, a holder for said work-members, said carriage having a traveling movement relative to said feeder and said holder, and means off to one side of said carriage acting to take the work-members from said platen as they are delivered therefrom by the rotation thereof, said feeder, said platen, and said last-mentioned means acting to take the work-members one by one from the holder to give them to the platen, so that the latter may rotate to bring the various parts thereof to the printing point, and by a further rotation deliver them to said last-mentioned means so that said last-mentioned means may take them away and deposit them to one side.

51. The combination with a traveling carriage, of a platen rotatably mounted on said carriage so as to travel therewith, a vibrating feeder acting to supply work-members to said platen at a certain point in the travel of said carriage, and vibrating delivering means acting to take a work-member from said platen at a predetermined point in the movement of said carriage.

52. The combination with a traveling carriage, of a platen mounted on said carriage and arranged to support work-members, delivering means for taking work-members from said platen, and operating means for actuating said delivering means operated in turn from said carriage by the traveling movement thereof.

53. The combination with a traveling carriage, of a platen mounted on said carriage and arranged to support work-members, delivering means operated from said platen for flipping work-members from said platen, and delivering means operated from said carriage for taking the work-members delivered from said platen and depositing them to one side.

54. The combination with a traveling carriage, of a platen mounted on said carriage and arranged to support work-members, delivering means operated from said platen for flipping work-members from said platen, and delivering means operated from said carriage for taking the work-members delivered from said platen and depositing them to one side, one of said delivering means being arranged to approach into proximity to the other delivering means to enable coöperation of the two.

55. The combination with a traveling carriage, of a platen on said carriage adapted to support work-members, delivering means effective to take away work-members after having left said platen, and delivering means for taking the work-members from said platen and turning them over to said first-mentioned delivering means while the latter is passive.

56. The combination with a traveling carriage, of a rotatable platen mounted on said carriage to travel therewith, means for traversing said carriage, means for rotating said platen, a feeder for supplying work-members to said platen, and mechanism for controlling the action of said feeder, said carriage and said platen, so that said feeder will be active while said carriage is passive and while said platen is in active rotation.

57. The combination with a carriage, of a platen mounted on said carriage arranged to support work-members, delivering means for taking the work-members as cast off by said platen, and actuating means for said carriage and said delivering means controlled so that said delivering means will be passive ready to receive work-members from said platen when said carriage is passive, and will be active when said carriage is traveling.

58. The combination with a traveling carriage, of a platen rotatably mounted on said carriage, delivering means for taking work-members from said platen, actuating means for traversing said carriage, actuating means for rotating said platen, actuating means for said delivering means, and controlling means arranged so that said delivering means will be passive while said carriage is passive and while said platen is actively rotating, and will be active while said carriage is actively traveling.

59. The combination, with typewriting mechanism, including a carriage, and a platen on said carriage; of means for withdrawing the work members from said platen; a movable device for catching and discharging the work members so withdrawn; and operating connections enabling the coöperation of said device and said carriage, whereby the movement of said carriage will control said device.

60. The combination, with a typewriting machine including a carriage traveling from side to side, and a platen on said carriage; of a feeder for supplying work members to said platen; and mechanism separate from said feeder for positively withdrawing the work members from said platen and delivering them off to one side of the machine at one end of the carriage.

61. The combination, with a typewriting machine including a carriage traveling from side to side, and a platen on said carriage; of a feeder for supplying work members to said platen; and automatic mechanism separate from said feeder including initially-acting means for positively withdrawing the work members from said platen, and subsequently-acting means for delivering the withdrawn work members off to one side of the machine at one end of the carriage.

LYMAN R. ROBERTS.

Witnesses:
PAUL GIVEN,
B. GOLDBERG.